United States Patent [19]
Parker et al.

[11] Patent Number: 4,893,897
[45] Date of Patent: Jan. 16, 1990

[54] PLASTIC OPTICAL FIBER FOR IN VIVO USE HAVING A BIOCOMPATIBLE POLYURETHANE CLADDING

[75] Inventors: Theodore L. Parker, Walnut Creek; David R. Pedersen, Clayton; Jerry D. Moseley, Walnut Creek, all of Calif.

[73] Assignee: Dow Chemical Company, Midland, Mich.

[21] Appl. No.: 163,056

[22] Filed: Mar. 2, 1988

[51] Int. Cl.$^4$ .............................................. G02B 6/00
[52] U.S. Cl. .................................................. 350/96.34
[58] Field of Search ............... 350/96.29, 96.30, 96.34; 428/364; 264/1.5

[56] References Cited

U.S. PATENT DOCUMENTS

| | | | |
|---|---|---|---|
| 3,980,390 | 9/1976 | Yamamoto et al. | 350/96.34 |
| 4,133,915 | 1/1979 | Noethe et al. | 427/1.60 |
| 4,370,466 | 1/1983 | Siemionko | 528/190 |
| 4,381,269 | 4/1983 | Kaino et al. | 264/1.5 |
| 4,472,019 | 9/1984 | Bishop et al. | 380/96.3 |
| 4,505,543 | 3/1985 | Ueba et al. | 350/96.34 |
| 4,552,431 | 11/1985 | Allemand et al. | 350/96.34 |
| 4,621,113 | 11/1986 | Collins | 524/196 |
| 4,631,329 | 12/1986 | Gornowitcz | 528/28 |
| 4,708,833 | 11/1987 | Oshawa et al. | 264/1.5 |

FOREIGN PATENT DOCUMENTS

| | | |
|---|---|---|
| 2459320 | 12/1975 | Fed. Rep. of Germany. |
| 57-188425 | 11/1982 | Japan. |
| 57-204004 | 12/1982 | Japan. |
| 59-206803A | 5/1983 | Japan. |
| 58-09870 | 6/1983 | Japan. |
| 2103785A | 12/1983 | United Kingdom. |

OTHER PUBLICATIONS

H. Ulrich (1983), "Urethane Polymers", in *Kirk-Othmer: Encyclopedia of Chemical Technology*, H. F. Mark, et al. (ed.) 3rd Ed., Vol. 23, pp. 576-608, John Wiley and Sons, New York, NY.
B. Hardman (1982) in "Silicon Compounds (Silicones)", in *Kirk-Othmer: Encyclopedia of Chemical Technology*, H. F. Mark, et al. (ed.), 3rd Ed., Vol. 20, pp. 922-962, John Wiley and Sons, New York, N.Y.
A. D. Pearson, et al., "Fiber Optics", *Kirk-Othmer: Encyclopedia of Chemical Technology*, 3rd Ed., Vol. 10, (1980), pp. 125 to 147.
A. C. Levy, "Optical Fibers", *Encyclopedia of Polymer Science and Engineering*, vol. 7, pp. 1 to 15 (1986).
F. H. Ulrich, "Urethane Polymers", *Kirk-Othmer: Encyclopedia of Chemical Technology*, Vol. 23 (1983) pp. 576-608.
J. E. McGrath, "Polyureasiloxane Copolymers", *Chemical Abstracts*, Vol. 106 (1987) 67737.
C. G. Gebelein, "Prosthetic and Medical Devices", *Kirk-Othmer Encyclopedia of Chemical Technology*, 3rd Ed., Vol. 19, (1982) pp. 275-313.
Wong et al., "Structure Property Relationships of Transparent Cycloaliphatic Polyurethane Elastomers", 186th Annual National Chemical Society (Proceedings) Washington, D.C. (1983).

*Primary Examiner*—Frank Gonzalez

[57] ABSTRACT

The present invention pertains to a flexible organic polymeric optical fiber core having an adherent flexible organic polymeric cladding on the outer surface. Preferably, the polymeric core has a refractive index which is at least 0.01 units greater than the refractive index of the polymeric polyurethane cladding. More particularly, the invention relates to an organic polymeric optical fiber for in vivo use in the tissue of a living mammal, preferably a human being. In addition to compatibility in live tissue and body fluids, such a fiber must be capable of repeatedly being deformed in a small bend radius without losing the ability to transmit light. The clad optical fibers are useful to measure levels of components (e.g. pH, oxygen, carbon dioxide) in moving living tissue, such as the heart or lungs.

17 Claims, 4 Drawing Sheets

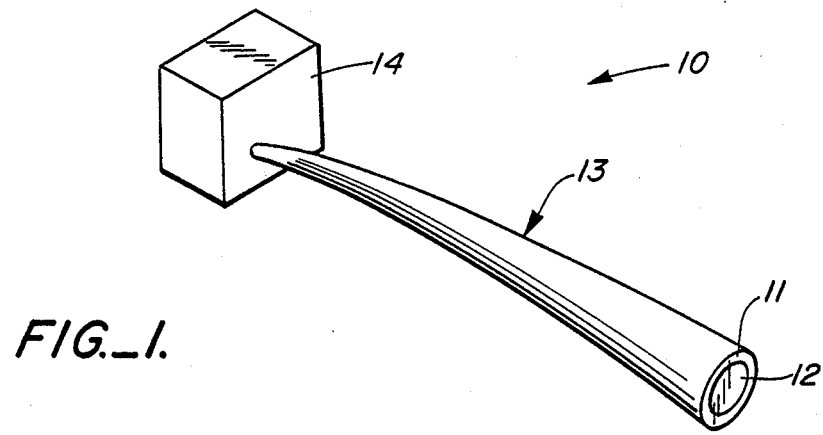
FIG._1.
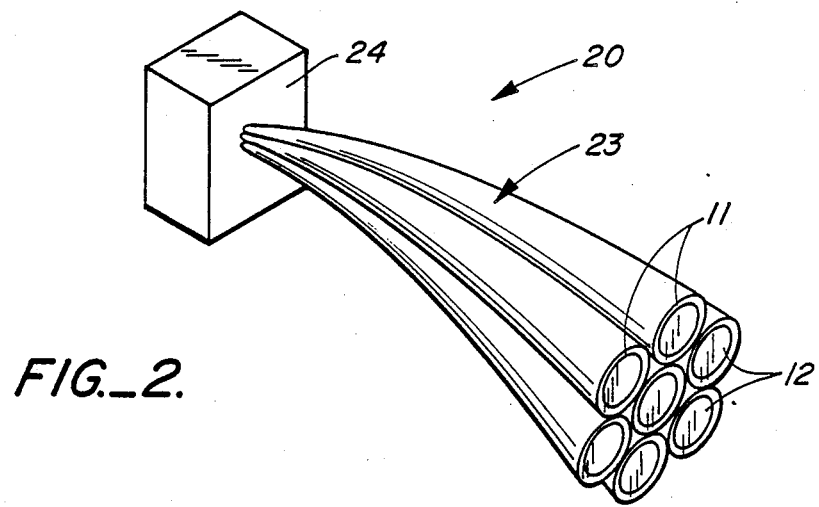
FIG._2.

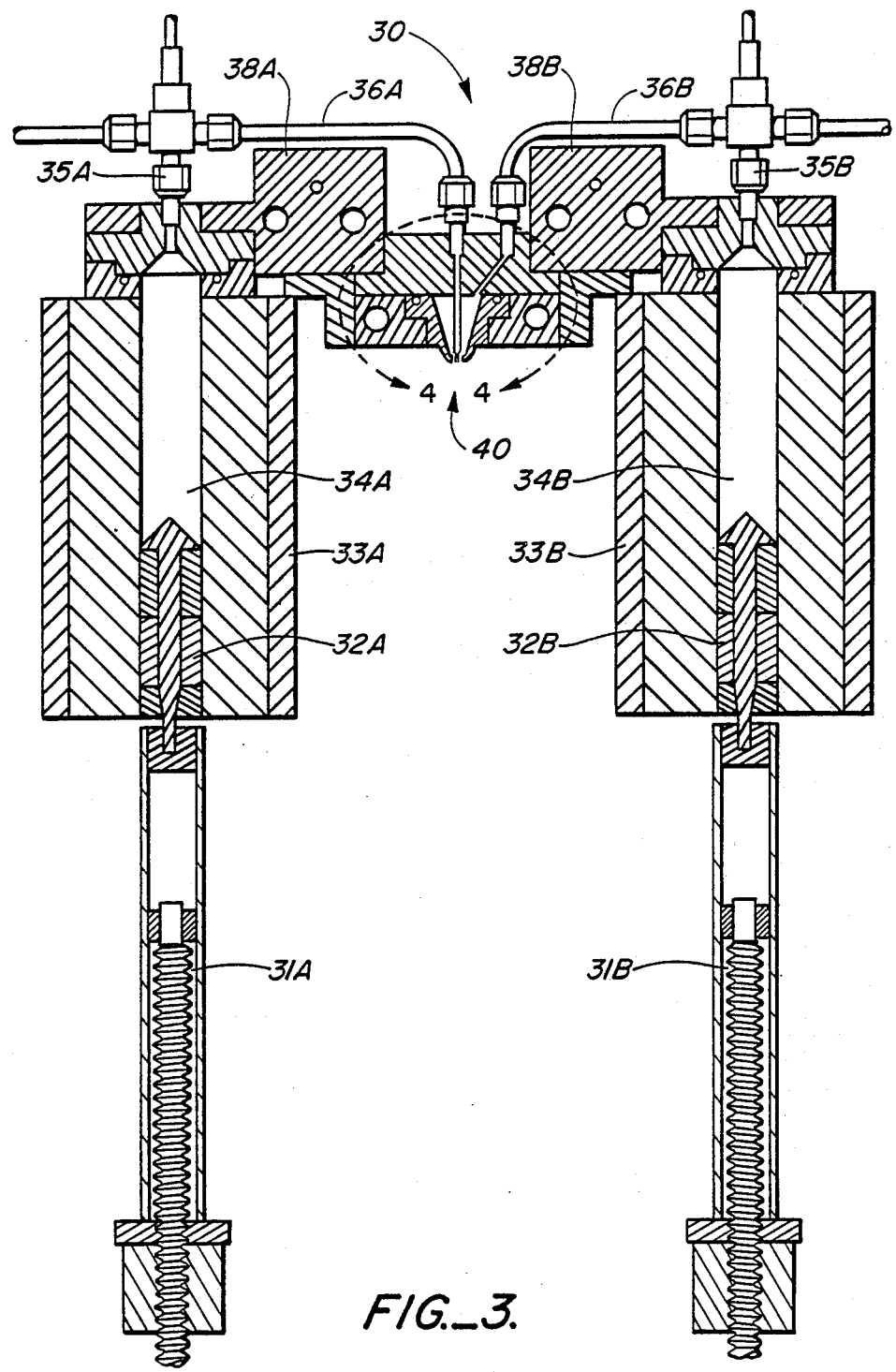
FIG._3.

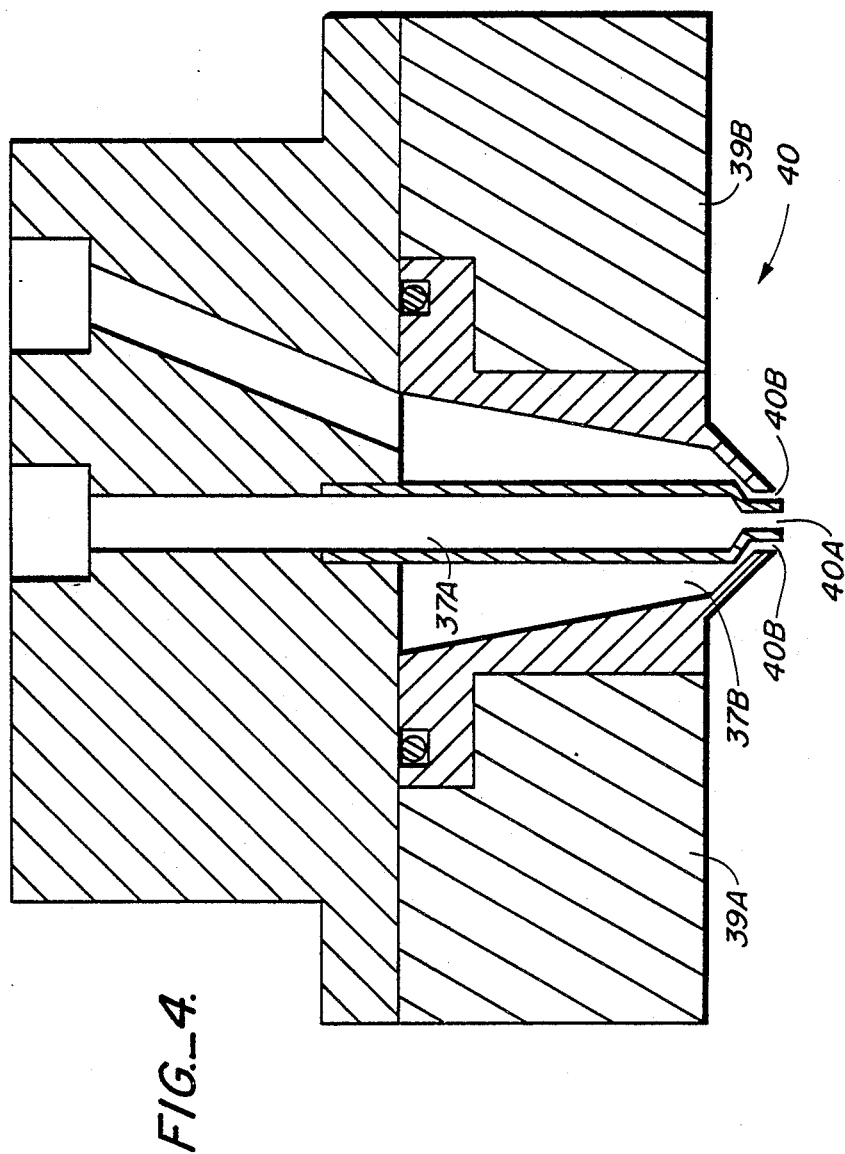
FIG._4.

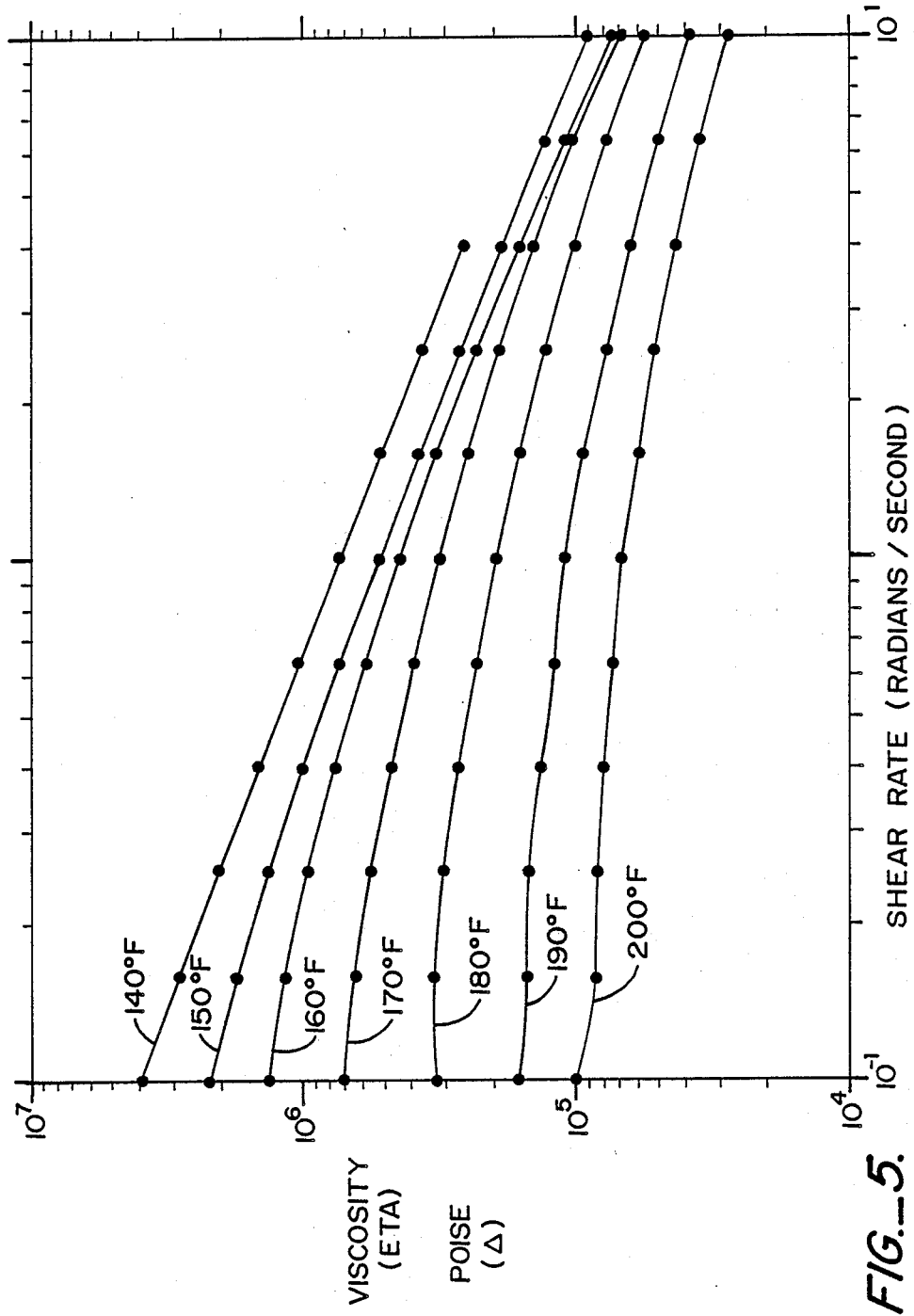
FIG._5.

PLASTIC OPTICAL FIBER FOR IN VIVO USE HAVING A BIOCOMPATIBLE POLYURETHANE CLADDING

BACKGROUND OF THE INVENTION

1. Field of the Invention

The present invention pertains to a flexible optical fiber core having an adherent flexible organic polymeric cladding on the outer surface. Specifically, the invention relates to an optical fiber for in vivo use in the tissue of a living mammal wherein the optical fiber has a flexible aliphatic poly(urethane) cladding on the outer surface of the polymeric optical fiber core. The optical fiber core preferably has a refractive index of at least 0.01 greater than the refractive index of the polymeric cladding.

2. Description of the Related Art

Fiber optics have been known for a number of years as described by A. D. Pearson et al. in "Fiber Optics" in the *Kirk-Othmer:Encyclopedia of Chemical Technology*, 3rd Ed., Vol. 10, John Wiley & Sons, New York, New York, pp. 125-147, published in 1980. Also see A. C. Levy, "Optical Fibers," in the *Encyclopedia of Polymer Science and Engineering*, H. F. Mark et al (ed.) Vol. 7, pp. 1 to 15, John Wiley and Sons, New York, New York, published in 1986.

S. R. Goldstein, European Pat. No. 073-558-A2 (March 1983) discloses the use of a chemical sensor for pH using a pH sensitive dye with an optical fiber.

S. Kingsley, et al., in *FC-7*; *Fiber Optics Sensors*, Chapter 10 "Chemical Sensors", published in 1984 by Information Gate Keepers, 214 Harvard Avenue, Boston, Mass. 02134, discusses the use of a number of sensors for in vitro use.

B. Noethe et al. in U.S. Pat. No. 4,133,915 discloses an optical glass fiber which is first coated with a high boiling optically clear liquid, then coated with a curable resin, such as a urethane.

T. E. Bishop et al. in U.S. Pat. No. 4,472,019 disclose radiation curable coating compositions adapted for application to buffer-coated optical fibers. The new composition comprises (1) from 25 to 70% of a diethylenic-terminated polyurethane (which may include urea linkages), where the polyurethane is based on a diisocyanate having an average molecular weight of from 400 to 5000 daltons, (2) from 5% to 40% of a diethylenically unsaturated ester of a diglycidyl ether of a bisphenol having a molecular weight up to about 1000, and (3) from 5 to 30% of a liquid radiation-curable monoethylenically unsaturated monomer having a Tg above about 55°C., especially N-vinyl pyrrolidone. Only glass optical fibers are disclosed.

The above references are incorporated herein in their entirety.

None of these references teach or suggest a current plastic for use as an organic polymeric optical fiber for long-term use in the tissue of a living mammal. An optical fiber for in vivo use in the body area of the beating heart, such as would be required in a heart pacemaker or a defibrillator, needs specific mechanical properties in addition to live tissue/body fluid compatibility. Such a fiber must be capable of being repeatedly deformed in a small bend radius without losing the ability t transmit light. That is, such an optical fiber for use in a moving, beating heart must have tremendous resistance to the development of microbending optical loss. These optical fibers would be useful in any body area for the measurement of various levels of substances or materials in a human body.

SUMMARY OF THE INVENTION

The present invention relates to a flexible optical fiber for in vivo use in the tissue of a living mammal, which optical fiber comprises:

(a) a flexible organic polymeric optical fiber core, and (b) an adherent flexible organic polymeric biocompatible cladding on the outer surface of the optical fiber core wherein the optical fiber core has a refractive index of at least 0.01 greater than the refractive index of the polymeric cladding.

In another aspect, the present invention relates to a method of producing a flexible organic polymer optical fiber having an adherent flexible organic polymeric cladding on the outer surface of a thermoplastic organic polymer optical fiber core for long-term in vivo use in the tissue of a living mammal, which process comprises:

(a) heating a thermoplastic optical fiber organic core polymer to temperature in excess of about 200°F. in the absence of moisture;

(b) heating a thermoplastic organic polymeric cladding to a temperature in excess of about 200°F. wherein the melt viscosity of the organic polymeric cladding is less than that of the organic polymer of step (a);

(c) coextruding the molten polymers such that the polymer of step (a) forms the solid optical fiber core and the polymer of step (b) forms the adherent organic polymeric cladding; and (d) producing the optical fiber wherein the refractive index of the organic polymer core is at least 0.01 greater than the refractive index of the organic polymeric cladding.

BRIEF DESCRIPTION OF THE DRAWINGS

FIG. 1 shows an isometric view of a single clad plastic optical fiber.

FIG. 2 shows an isometric view of an array of clad plastic optical fibers to act as a probe transmitting a signal or to detect different signals.

FIG. 3 shows a schematic representation of the coextrusion apparatus.

FIG. 4 shows a larger schematic representation of the spinnerette area of the coextrusion apparatus along line 4—4.

FIG. 5 shows the rheological properties (viscosity-shear-temperature plot) of a poly(styrene) optical fiber core that can be clad with an all aliphatic thermoplastic poly(urethane).

DETAILED DESCRIPTION OF THE INVENTION AND PREFERRED EMBODIMENTS

Definitions

As used herein:

"Diisocyanate" refers to the aliphatic diisocyantes described by Collins, U.S. Pat. No. 4,621,113, which is incorporated herein by reference.

"Glycol" refers to glycols as described by G. R. Collins (above), and also includes short segments of diols having 2-6 carbon atoms.

"Chain Extender" refers to short chain non flexibilizing compounds as described by Collins above.

"Macroglycol" refers to a polyglycol having a molecular weight of between about 1000 to about 6000 daltons as described by Collins above.

Referring now to FIG. 1, the optical fiber core 12 and clad are connected via line 13 in an analytical system 10 to a recorder or analyzer 14. Recorder or analyzer 14 can be any one of a group of analytical/recording/or storage devices known in the art. FIG. 2 shows a tightly packed array 20 of the optical fiber core 12 and cladding 11 connected to analyzer 24 using multifilament 23. An array is used to provide an additive signal for measurement or can be used to measure different aspects of the fluid or tissue within the body, e.g., pH, oxygen, carbon dioxide, etc. The optical fiber of the present invention for use such as in or near a beating heart must have tremendous resistance to the development of microbending optical loss. A preferred fiber is one where the optical core has a refractive index of at least 0.01 units greater than the refractive index of the polymeric cladding, especially about 0.01 to 0.17.

Currently available plastic optical fibers are usually clad with poly(methyl methylacrylate) (PMMA) or poly(vinylidene fluoride) (PVDF). However, currently available polymers are not suitable for contact with living tissue and body fluids. New sensing devices have been developed and are available for sensing biologically important chemical species (such as pH, $pO_2$, $pCO_2$, and the like) using optrodes (optical sensing devices). See, for example, Goldstein, et al. (above) or J.H.W. Cramp, et al., U.K. Pat. No. 2,103,786A, which is incorporated herein by reference. A chromophoric tip, which is sensitive to pH, or to specific chemicals, temperature, etc., is placed at the end of the optical fiber. As the color of the chromophore changes in vivo, the change is transmitted back to the optical fiber and measured. By proper selection of the optical properties in a core plastic, and a biologically compatible polymeric optical clad, a polymer optical fiber (POF) capable for use in real time in vivo medical diagnostics is produced. Typically, the use of a poly(urethane) for use in optical fibers is restricted to buffer coats over the optical glass core, and under the over-wrap in an optical cable.

In the present invention, the thin poly(urethane) layer is both the optical clad and the exterior layer to be in contact with the body tissue and body fluids. In this way, a smaller, thinner, more supple optical fiber (filament) is prepared for insertion directly into the body and through confined orifices, such as blood vessels. A preferred clad is an aliphatic poly(urethane). These include for example, polyurethanes prepared from hydrogenated methylene diphenyl diisocyanate, 1,4-cyclohexane diisocyanate and aliphatic diols, such as 1,4-butanediol, polyethylene glycol, and the like. A preferred optical core for the fiber is independently selected from any of the following: poly(styrene), PMMA, poly(carbonate), poly(urethane), or copolymers of styrene and methyl methacrylate, styrene and methyl acrylate, methyl methacrylate and ethyl acrylate, styrene and α-methyl styrene, styrene and vinyl toluene, or the like.

The linear segmented poly(urethane) as the cladding of the present invention are normally those found in the chemical art. Preferred poly(urethanes) are those described by G. R. Collins in U.S. Pat. No. 4,621,113. A more preferred poly(urethane) is one having a soft segment/isocyanate/hard segment (i.e., macroglycol/-diisocyanate/chain extender) having a mole ratio of about 1/6/5. The refractive index (RI) of the clad is between about 1.47 and 1.49.

Various compositional, structural and processing factors which effect the biological and physical properties of segmented poly(urethanes) are well known and described in U.S. Pat. No. 4,621,113 and also by G. G. Gebelein in "Prosthetic and Medical Devices" In Kirk-Othmer:Encyclopedia of Chemical Technology, 3rd ed., Vol. 19, pp 275–313 published in 1982; and also see Wong et al, "Structure-Property Relationships of Transparent Cycloaliphatic Polyurethane Elastomers," 186th Annual National Meeting of the American Chemical Society (Proceedings), Wash., D.C., published in 1983.

All of the above references are incorporated herein by reference.

There are a number of methods to produce the plastic optical fibers of the present invention.

Co-Extrusion—The plastic optical core and the polymeric cladding are simultaneously co-extruded from an apparatus as shown in FIGS. 3 and 4. FIG. 3 is a coextrusion apparatus 30.

Drive screw 31A for the molten polymer of the core is used to mechanically push seal piston 32A up through heated block 33A. The molten or softened polymer 34A is forced through lines 35A and 36A into chamber 37A to the middle opening 40A of the spinnerette shown in FIGS. 3 and 4. The core polymer is kept molten at the appropriate temperature using heat blocks 38A and 39A and 39B.

In a similar manner, drive screw 31B for the molten polymer of the cladding is used to mechanically push seal piston 32B up through heated block 33B. The molten or softened polymer 34B is forced through heated lines 35B and 36B into the chamber 37B to the concentric outer opening 40B of the spinnerette shown in FIGS. 3 and 4. The polymer is kept molten at the appropriate temperature using heat blocks 39A and 39B.

As is shown in cross-section in FIG. 4, at the top of the openings of the spinnerette, core polymer 34A enters at 37A and clad polymer 34B enters at 37B. The core polymer moves down through channel 37A and extrudes as a continuous small diameter solid cylinder at 40A. The clad polymer 34B moves down through channel 37B and extrudes as a continuous small diameter hollow cylinder at 40B. The cylinders combine, and the core/clad optical fiber is thus formed upon cooling.

It is expected that existing analytical devices, such as a Hewlett Packard Model 47201A Ear Oximeter, Hewlett Packard Corporation, Page Mill Road, Palo Alto, California, will be adapted to function with the optical fibers of the present invention.

In one preferred embodiment the flexible clad optical fiber is one where the flexible optical fiber core is selected from poly(styrene), poly(methyl methacrylate) poly(carbonate) or poly(urethane).

In another preferred embodiment the flexible optical fiber is one where the organic polymeric cladding is an aliphatic poly(urethane).

Further, a preferred embodiment is one in which the polymeric optical core is colorless, and the polymer is filtered hot (between about 250 and 450°F. so that particles are 50 microns (preferably 20 microns) or smaller.

In still another preferred embodiment the flexible optical fiber is one where the flexible optical fiber core is selected from poly(styrene) or from an aliphatic poly(urethane), having a refractive index of about 1.4 to 1.9.

A preferred embodiment of the process is one where the temperatures of steps (a), (b) or (c) are each between about 200° and 450°F., especially about 300 to 375°F.

In another preferred embodiment, the process is one where the optical fiber organic polymer core is selected from poly(styrene), poly(methyl methacrylate), poly(carbonate) or poly(urethane), especially the process where the organic polymeric cladding is a poly(urethane).

The following examples are to be interpreted as being descriptive and illustrative only. They are not to be construed as being limiting in any way.

EXAMPLE 1

Poly(styrene) Core Having a Poly(urethane) Cladding (a) A dual ram coextrusion apparatus of FIG. 3 is charged with poly(styrene) pellets (polymer optical fiber (POF) grade, MW 200,000, Dow Chemical Co., Midland, Mich.), and is heated to 340°F. In a similar way, an all aliphatic poly(urethane) LSP XU63111.02, Dow Chemical Company, North Haven, Conn., is charged in the cladding chamber and heated to 320°F. The melt viscosity of the poly(urethane) clad is less than that of the poly(styrene) (core) under all temperatures and shear rates experienced during the coextrusion. The transfers are held at 360°F. for poly(styrene) and 320°F. for poly(urethane). The spinnerette trip is held at 340°F. A core/clad concentric polymeric optical fiber is melt extruded at 500 psi to give a 750 micron diameter optical fiber having a poly(urethane) clad and poly(styrene) core. The light attenuation value for the fiber is found to be 1.15 decibels/meter. The poly(urethane) clad thickness is about 10 microns. The rheological properties of the poly(styrene) core polymer (viscosity/shear/temperature plot) are shown in FIG. 5. As can be seen, viscosity does decrease as temperature is increased, and the viscosity decreases with increasing shear rate. RI of the core is 1.59.

EXAMPLE 2

Poly(styrene) Core Having a Poly(urethane) Clad (a) The process described by Example 1 is followed except for the following:

A spinnerette is used and a more uniform optical fiber is produced at a temperature of 350°F. More size fluctuation is observed at 330°F., where the spinnerette produces a non-concentric fiber having an attenuation equal to 2.5 dB/m. The stress (tension) is measured at 20-25 gram for a 0.25 mm fiber.

EXAMPLE 3

Use of a Clad Optical Fiber to Detect pH in a Living Mammal

The clad optical fiber of Example 1 has added at the analytical tip a chromophore which is sensitive to pH as described by J.H.W. Cramp et al., U.K. Pat. No. 2,103,786A, which is incorporated herein by reference. The clad optical fiber is inserted into a living dog into the left ventricle chamber of the heart. The fiber operates continuously for 90 days monitoring pH level without a loss of optical properties.

While only a few embodiments of the invention have been shown and described herein, it will become apparent to those skilled in the art that various modifications and changes can be made in a polymer clad optical fiber, its fabrication, or its use as an optical probe in a living mammal, preferably a human being, without departing from the spirit and scope of the present invention. All such modifications and changes coming within the scope of the appended claims are intended to be carried out thereby.

We claim:

1. A flexible optical fiber for in vivo use in the tissue of a living mammal, which optical fiber comprises:
    (a) a flexible organic polymeric optical fiber core, and
    (b) an adherent flexible organic polymeric cladding selected from a poly(urethane) on the outer surface of the optical fiber core wherein the optical fiber core has a refractive index of at least 0.01 greater than the refractive index of the polymeric cladding.

2. The flexible optical fiber of claim 1 wherein the flexible optical fiber core is selected from poly(styrene), poly(methyl methacrylate), poly(carbonate), poly(urethane) or a copolymer of styrene and methyl methacrylate, styrene and methyl acrylate, methyl methacrylate and ethyl acrylate, styrene and α-methyl styrene, or styrene and vinyl toluene.

3. The flexible optical fiber of claim 1 where the organic polymeric cladding is an aliphatic poly(urethane).

4. The flexible optical fiber of claim 3 wherein the flexible optical fiber core is selected from poly(styrene).

5. The optical fiber of claim 3 wherein the poly(urethane) is a linear segmented polyurethane comprising a macroglycol, a diisocyante and a chain 6. The optical fiber of claim 5 where the molar ratio of macroglycol/diisocyanate/chain extender is about 0.15 to 1.5/5 to 7/4 to 6 respectively.

7. A method of producing a flexible organic polymer optical fiber having an adherent flexible organic polymeric cladding on the outer surface of an organic polymer optical fiber core for long-term in vivo use in the tissue of a living mammal, which process comprises:
    (A) heating an optical fiber organic polymeric core material to temperature of between about 200° and 450° in the absence of moisture;
    (B) heating an organic polymeric cladding to a temperature of between about 200° and 450°F. wherein the melt viscosity of the organic polymeric cladding is less than that of the heated organic polymeric core material;
    (C) coextruding the molten polymers such that the heated polymeric core material forms the solid optical fiber core and the cladding polymer selected from a poly(urethane) forms the adherent organic polymeric cladding; and
    (D) producing the optical fiber wherein the refractive index of the organic polymer core is at least 0.01 less than the refractive index of the organic polymeric cladding.

8. The process of claim 7 wherein the temperature of the organic core material and of the organic polymeric cladding prior to coextrusion is between about 300 and 350°F.

9. The process of claim 8 wherein the optical fiber organic polymer core is selected from poly(styrene), poly(methylmethacrylate), poly(carbonate), poly(urethane) or a copolymer of styrene and methyl methacrylate, styrene and methyl acrylate, methyl methacrylate and ethyl acrylate, styrene and α-methyl styrene, or styrene and vinyl toluene, each polymer core having a refractive index of between about 0.01 to 0.17 units greater than the refractive index of the polymeric clad.

10. The process of claim 9 wherein the polymer core is optically clear poly(styrene).

11. The process of claim 10 wherein the poly(styrene) has a molecular weight of about 200,000.

12. The process of claim 10 wherein the cladding is an aliphatic poly(urethane).

13. The process of claim 12 wherein the poly(urethane) is a linear segmented polyurethane comprising a macroglycol/diisocyanate/chain extender.

14. The process of claim 13 wherein the molar ratio of macroglycol/diisocyanate/chain extender is about 0.15 to 1.5 for the macroglycol/5 to 7 for the diisocyanate/and 4 to 6 for the chain extender.

15. The process of claim 7 wherein the core organic polymer is optically clear, and the monomer is treated to remove particles greater than 0.2 microns prior to polymerization.

16. The process of claim 7 wherein the core monomer is filtered to remove particles smaller than 0.2 microns and the polymer is filtered at between 295—400°F. to remove particles greater than 20 microns.

17. The process of claim 16 wherein the core polymer is poly(styrene) and the clad polymer is a linear segmented poly(urethane).

* * * * *

UNITED STATES PATENT AND TRADEMARK OFFICE
CERTIFICATE OF CORRECTION

PATENT NO. : 4,893,897

DATED : January 16, 1990

INVENTOR(S) : Theodore L. Parker; David R. Pedersen; Jerry D. Moseley

It is certified that error appears in the above-identified patent and that said Letters Patent is hereby corrected as shown below:

Col. 1, line 64, after "ability" delete "t" and insert -- to --;

Col. 6, (Claim 5) line 29, "diisocyanate" has been misspelled;

Col. 6, (Claim 5) line 29, after "chain" insert -- extender. --;

Col. 6, (Claim 6) line 40, after "450°" insert -- F. --.

Signed and Sealed this

Third Day of December, 1991

Attest:

HARRY F. MANBECK, JR.

*Attesting Officer*   *Commissioner of Patents and Trademarks*